US012810762B2

(12) United States Patent
Ooghe et al.

(10) Patent No.: US 12,810,762 B2
(45) Date of Patent: Nov. 24, 2026

(54) DISPLAY DEVICE

(71) Applicant: Scioteq BV, Kortrijk (BE)

(72) Inventors: Jürgen Hector Ooghe, Gavere (BE); Reinert Verstraete, Pittem (BE); Chien-Hung Chen, Deerlijk (BE)

(73) Assignee: Scioteq BV (BE)

( * ) Notice: Subject to any disclaimer, the term of this patent is extended or adjusted under 35 U.S.C. 154(b) by 0 days.

(21) Appl. No.: 19/537,017

(22) Filed: Feb. 11, 2026

(65) Prior Publication Data

US 2026/0179516 A1 Jun. 25, 2026

Related U.S. Application Data

(63) Continuation of application No. PCT/EP2025/056626, filed on Mar. 11, 2025.

(30) Foreign Application Priority Data

Mar. 11, 2024 (BE) .................................. 2024/5143

(51) Int. Cl.

| | |
|---|---|
| ***G09G 3/20*** | (2006.01) |
| ***G09G 3/3225*** | (2016.01) |
| ***G09G 3/36*** | (2006.01) |

(52) U.S. Cl.

CPC ............. *G09G 3/20* (2013.01); *G09G 3/3225* (2013.01); *G09G 3/3696* (2013.01)

(58) Field of Classification Search

CPC ....... G09G 3/20; G09G 3/3225; G09G 3/3696
See application file for complete search history.

(56) References Cited

U.S. PATENT DOCUMENTS

| | | | |
|---|---|---|---|
| 7,295,179 | B2 | 11/2007 | Dunn |
| 10,056,045 | B2 | 8/2018 | Dunn et al. |

(Continued)

FOREIGN PATENT DOCUMENTS

| | | |
|---|---|---|
| WO | 2023017137 A1 | 2/2023 |

OTHER PUBLICATIONS

International Search Report (PCT/ISA/210) and Written Opinion (PCT/ISA/237) mailed Jun. 5, 2025, by the European Patent Office as the International Searching Authority for International Application No. PCT/EP2025/056626. (23 pages).

(Continued)

*Primary Examiner* — Jonathan A Boyd

(74) *Attorney, Agent, or Firm* — Buchanan Ingersoll & Rooney PC

(57) ABSTRACT

A flat panel active-matrix or passive-matrix display includes: a single back substrate divided into multiple electrically isolated or non-isolated, separately addressable, functional display sections, a set of source signal lines defining a set of columns, a set of gate signal lines defining a set of rows, and a set of pixel cells arranged in a matrix of rows and columns. Each pixel cell is addressable by a corresponding SG pair which includes a source signal line and a gate signal line, at least a first source driver circuit coupled to a first portion of the source signal lines corresponding to a first display section and a second source driver circuit coupled to a second portion of the source signal lines corresponding to a second display section. At least a first gate driver circuit is coupled to a first portion of the gate signal lines.

15 Claims, 9 Drawing Sheets

(56) References Cited

U.S. PATENT DOCUMENTS

| | | | | |
|---|---|---|---|---|
| 11,043,176 | B2 | 6/2021 | Echols et al. | |
| 2011/0234574 | A1 * | 9/2011 | Tanaka | G09G 3/2096<br>345/211 |
| 2018/0233077 | A1 * | 8/2018 | Fletcher | G09G 3/2092 |
| 2020/0035177 | A1 | 1/2020 | Kawachi | |
| 2020/0279537 | A1 * | 9/2020 | Echols | G09G 3/3666 |
| 2022/0122560 | A1 * | 4/2022 | Fu | G09G 3/3677 |

OTHER PUBLICATIONS

Belgian Search Report with full translation mailed Mar. 17, 2025, by the Belgian Intellectual Property Office for corresponding Application No. BE2024/5143. (40 pages).

* cited by examiner

DISPLAY DEVICE

CROSS-REFERENCE TO RELATED APPLICATIONS

This application is a U.S. continuation patent application of PCT International Patent Application No. PCT/EP2025/056626, filed on Mar. 11, 2025, which claims the benefit of Belgian Patent Application No. BE 2024/5143, filed on Mar. 11, 2024, the disclosures of which are hereby incorporated by reference herein in their entireties.

TECHNICAL FIELD

The present invention pertains to the field of displays, preferably active-matrix displays, more preferably liquid crystal displays, and more in particular to the field of fail tolerant displays.

BACKGROUND

Liquid crystal displays (LCDs) are popular for home entertainment purposes, but also for informational/advertising displays in both indoor and outdoor locations as well as within moving vehicles subject to substantial shock. They are also used in critical control and monitoring systems, for instance on board of aircraft. In such situations, faults can be induced in the display, e.g. due to such substantial shocks, electromagnetic interference, etc. Hence, there is a need to provide displays, and in particular LCDs, which are tolerant to faults.

For example, U.S. Pat. No. 10,056,045 B2 discloses an exemplary embodiment, wherein each horizontal and vertical conductor of a TFT array may be in electrical contact with a first and second control system. Initially, the entire display is driven by the first control system. When/if a failure occurs in the first control system, it is powered down and the second control system maintains operation of the entire display. Each control system may contain a set of source/gate drivers, display interface board, and power supply. A reversionary button may allow the user to manually switch between control systems. Alternatively, failure may be detected by the display interface boards or a graphics processor.

Also, international patent application WO 2023/017137 A1 discloses a fault-tolerant active matrix display device for avionics systems comprising: a panel glass, a set of source signal lines, and a set of gate signal lines, each of the gate signal lines comprising a first gate line end and a second gate line end on opposite sides of the panel glass; a source driver circuit coupled to at least a portion of the source signal lines, a first gate driver circuit comprising a first set of gate driver cells, each of the gate driver cells of the first gate line driver circuit comprising a gate line output connected to one of the set of gate signal lines at the first gate line end thereof; a second gate driver circuit comprising a second set of gate driver cells, each of the gate driver cells of the second gate line driver circuit comprising a gate line output connected to one of the set of gate signal lines at the second gate line end thereof, wherein the first gate driver circuit and the second gate driver circuit are configured to drive the gate signal lines collaboratively, and wherein the first gate driver circuit is configured, upon a failure in the second gate driver circuit, to induce a floating state in the gate line output of each gate driver cell of the second gate driver circuit, and wherein the second gate driver circuit is configured, upon failure in the first gate driver circuit, to induce a floating state in the gate line output of each gate driver cell of the first gate driver circuit.

These prior art documents provide solutions which allow to keep driving at least partially the display in case of an error.

U.S. Pat. No. 7,295,179 B2 discloses a flat panel display having a single back glass substrate and a single color filter passive plate divided into multiple, electrically isolated, separately addressable, functional sections having no visible seam between sections. Hereby, the sections can be driven independent from one another, ensuring that upon failure in one section, one or more other sections are still operable and can display possibly vital information.

U.S. Pat. No. 11,043,176 B2 discloses a redundant display which uses row and column drivers to control an active matrix of transistors arranged in a pixel array. Row drivers arranged on respective sides of the pixel array control the voltage across entire rows of the pixel array in tandem. One or more sets of column drivers control the voltage across columns of the pixel array. One or more columns of switching elements are disposed between left and right portions of the pixel array. During normal operation, the column of switching elements connects left row portions with right row portions, such that an image is displayed across the entire pixel array. Responsive to a malfunction of row drivers on one side of the pixel array, the column of switching elements isolates the left row portions from the right row portions, such that the image may be displayed only on the other side of the pixel array.

The problem with a display having multiple functional seamless sections, such as described in U.S. Pat. Nos. 7,295,179 B2 or 11,043,176 B2, is that upon failure, a "frozen image" may remain on the faulty section due to the faulty section of the display remaining in the last state. Such frozen image is considered even more dangerous than an empty display or display section, since it may relay outdated information.

The present invention aims to overcome this and other problems and thereto provides a display comprising multiple sections which is configured to solve the problem of a frozen image and any side effects which may occur.

SUMMARY OF THE INVENTION

The present invention relates to a flat panel active-matrix or passive-matrix display, preferably an active matrix display, more preferably a liquid crystal display (LCD) such as a TFT-LCD, the display comprising:

- a single back substrate, preferably a glass substrate, divided into multiple electrically isolated or non-isolated, separately addressable, functional display sections, preferably having no visible seam between said multiple display sections,
- a set of source signal lines defining a set of columns, a set of gate signal lines defining a set of rows, and a set of pixel cells arranged in a matrix of rows and columns such that each pixel cell is addressable by a corresponding SG pair which consists of a source signal line and a gate signal line,
- at least a first source driver circuit coupled to a first portion of the source signal lines corresponding to at least a first display section and a second source driver circuit coupled to a second portion of the source signal lines corresponding to at least a second display section,
- at least a first gate driver circuit coupled to a first portion of the gate signal lines, whereby, during normal operation, each pixel cell is configured to be charged with a pixel-dependent electrical signal, preferably a signal voltage or a signal current, provided by the source signal line of the SG pair corresponding to said pixel cell when the gate signal line of the SG pair corresponding to said pixel cell is activated, and whereby, upon instruction with respect to the first display section, each pixel cell of said first display section is configured to adopt a default electrical signal, preferably a default voltage or a default current, provided by the source signal line of the SG pair corresponding to said pixel cell.

The invention is particularly apt in ensuring that a display continues to at least partially work if an error occurs in one of the display sections, i.e. if a display section breaks down, the other display sections may still work properly without the problem of a frozen image on the fault display section. Hence, in a preferred embodiment, the instruction with respect to the first display section is or comprises an indication of a failure in the first display section.

However, note that the invention can also be applied in other applications, for instance if it is necessary or advantageous to power down a specific display section, e.g. for power conservation of for security reasons. Hence, the instruction with respect to the first display section may be or may comprise:

- an indication of a failure in the first display section;
- an indication of a power-down sequence for the first display section;
- a user input indicating that the first display section is to be turned into a uniform state, preferably a black state, and/or
- any other type of instruction indicating that each pixel cell of said first display section is to adopt a default electrical signal.

In what follows, we will describe the invention mainly with respect to the case where the instruction with respect to the first display section is indicative of a failure in the first display section. However, it should be noted that the present discussion holds equally for other types of instructions, in particular those described here above.

The pixel-dependent electrical signal preferably comprises video data. Also preferably, the pixel-dependent electrical signal and the default electrical signal are voltage signals.

The present invention hereby thus allows to solve the problem of the frozen image, since failure in the faulty section does not lead to the pixel cells of the faulty section remaining in their last known state, but are driven to present a default state essentially defined by the default voltage. As a result the pixel cells of each of the faulty section will all default to essentially the same state. This can be used to bring the faulty part of the display in a predefined bright or dark state.

For color displays, a color pixel may typically comprise a red subpixel, a green subpixel and a blue subpixel (RGB color scheme), which can be individually steered to provide essentially any visible color to the pixel. Note that, for the purpose of the current invention, we use the terminology of "pixel" or "pixel cell" to denote an elementary electronically driven element which can be individually addressed. In this regard, a subpixel in the sense of a component of a color pixel is also included in the term "pixel" unless explicitly otherwise mentioned.

Note that another possible solution to the frozen image problem, could be to turn off the backlight for the faulty section, resulting in the faulty section going dark. However, because one wants to keep the working display sections active, the backlight of the working sections will remain turned on, which may possibly lead to leakage of light into the faulty section, thereby again resulting in a partial frozen image. Clearly, such partial frozen image is also an unwanted side effect. Nevertheless, in a preferred embodiment of the present invention, the display is configured to turn off the backlight of the first display section, preferably upon failure therein. This can be done in addition to the uniform state of the pixels in the first display section.

In a particularly preferred embodiment, the default electrical signal is a default voltage which is a common reference voltage (VCOM). The VCOM basically is a reference voltage for the pixel cells of the display or of a display section, the VCOM essentially defining a black state for the pixel cells, i.e. if the VCOM is applied to the source signal line of a pixel cell and the pixel cell is addressed, the pixel cell will be black. Hence, using the VCOM as the default voltage will result in the first section becoming black. A main benefit of this, is one can provide one VCOM electrode plane for the entire display providing a first electrode for each of e.g. the pixel capacitors. One general VCOM plane avoids a fine-tuned calibration between all display sections that would be needed when the display sections have electrically isolated VCOM electrode planes. VCOM is also already present on the display, so there is no need to provide an additional supply voltage as default voltage.

In some embodiments, the VCOM electrode plane is common for all pixel cells of the display. In other embodiments, each display section comprises a VCOM electrode which is common for all pixel cells of said display section.

In some embodiments, a first power source is configured to supply the VCOM for the first display section and/or a second power source is configured to supply the VCOM for the second display section. Alternatively, a first power source and a second power source are configured to jointly supply the VCOM for the first display section and the second display section.

In some embodiments, a first power source is configured to supply the VCOM for the first display section and the second display section and a second power source is configured to supply the VCOM for the first display section in case of failure of the first power source. Alternatively, the second power source is configured to supply the VCOM for the first display section and the second display section and the first power source is configured to supply the VCOM for the second display section in case of failure of the second power source. I.e. in preferred embodiment, one power source is configured to supply the VCOM for the first display section and the second display section and optionally all display sections, and at least one other power source is configured to supply VCOM for the first display section and the second display section and optionally all display sections in case of failure of said one power source. Basically, this results in redundancy of the power source with respect to supply of the VCOM.

In some embodiment, at least two and preferably all display sections of the display are arranged contiguously, i.e. next to one another. Alternatively, or additionally, at least two and preferably all display sections of the display are arranged interleaved, i.e. at least two and preferably all source signal lines are arranged in between at least two and preferably all source signal lines of a second display section and/or at least two and preferably all gate signal lines are arranged in between at least two and preferably all gate signal lines of a second display section. Such interleaved source signal lines and/or gat signal lines can for instance described in U.S. Pat. No. 10,056,045 B2. The interleaving may in an embodiment also correspond with subpixels of a single color. For instance, the red subpixels may correspond with a first display section, the green subpixels may correspond to a second display section and the blue subpixels may correspond to a third display section. Note also that a first set of display sections may be arranged contiguously to a second set of display sections while display sections of the first set may be arranged interleaved and/or display sections of the second set may be arranged interleaved. This allows to bring a first display section of the first set into a uniform state, for instance a uniform color state (e.g. a blue-screen or purple-screen) if the second set of interleaved display sections correspond to subpixel sections. Hereby, for instance, the blue subpixels of a first contiguous display section may be provided with a default non-zero electrical signal, while the red and green subpixels of the same first contiguous display section may be provided with a VCOM, essentially turning the red and green colored subpixels off in the first contiguous display section.

The idea of providing a default electrical signal to source lines provides an additional possibility of discharging the pixels, in particular during a powering-down sequence. Indeed, the idea of providing a default electrical signal to the source lines, in particular a default voltage, more in particular a VCOM, helps in discharging the pixels. Consequently, the present invention also relates to a flat panel active-matrix or passive matrix display, preferably a liquid crystal display, comprising:

- a single back substrate, preferably a glass substrate, divided into at least one and preferably multiple electrically isolated or non-isolated, separately addressable, functional display sections, preferably having no visible seam between said multiple display sections,
- a set of source signal lines defining a set of columns, a set of gate signal lines defining a set of rows, and a set of pixel cells arranged in a matrix of rows and columns such that each pixel cell is addressable by a corresponding SG pair which consists of a source signal line and a gate signal line,
- at least a first source driver circuit coupled to a first portion of the source signal lines corresponding to at least a first display section and optionally a second source driver circuit coupled to a second portion of the source signal lines corresponding to at least a second display section,
- at least a first gate driver circuit coupled to a first portion of the gate signal lines, whereby, during normal operation, each pixel cell is configured to be charged with a pixel-dependent electrical signal, preferably a voltage signal or a current signal, provided by the source signal line of the SG pair corresponding to said pixel cell when the gate signal line of the SG pair corresponding to said pixel cell is activated, and whereby, upon powering down a display section, each pixel cell of said display section is configured to adopt a default electrical signal, preferably a default voltage or a default current, more preferably a VCOM, provided by the source signal line of the SG pair corresponding to said pixel cell. Preferably the default electrical signal is provided to the pixel cells by switching a multiplexer switch, such as a VCOM mux, thereby connecting the source lines addressing the pixel cells to the default electrical signal. This allows to power down the display independent of any source drivers or any video generator, i.e. the source drivers or video generators are being by-passed.

OVERVIEW OF THE FIGURES

DETAILED DISCUSSION OF THE INVENTION

The present invention concerns a flat panel active-matrix or passive-matrix display as described in claim 1, preferably a liquid crystal display.

Note that in the following discussion, many embodiments and examples are focused on displays having two display sections. However, it should be noted that the present invention can be applied to displays having more than two display sections and that the embodiments and examples presented in this document can be readily extended to such displays having more than two display sections.

Figure 1:
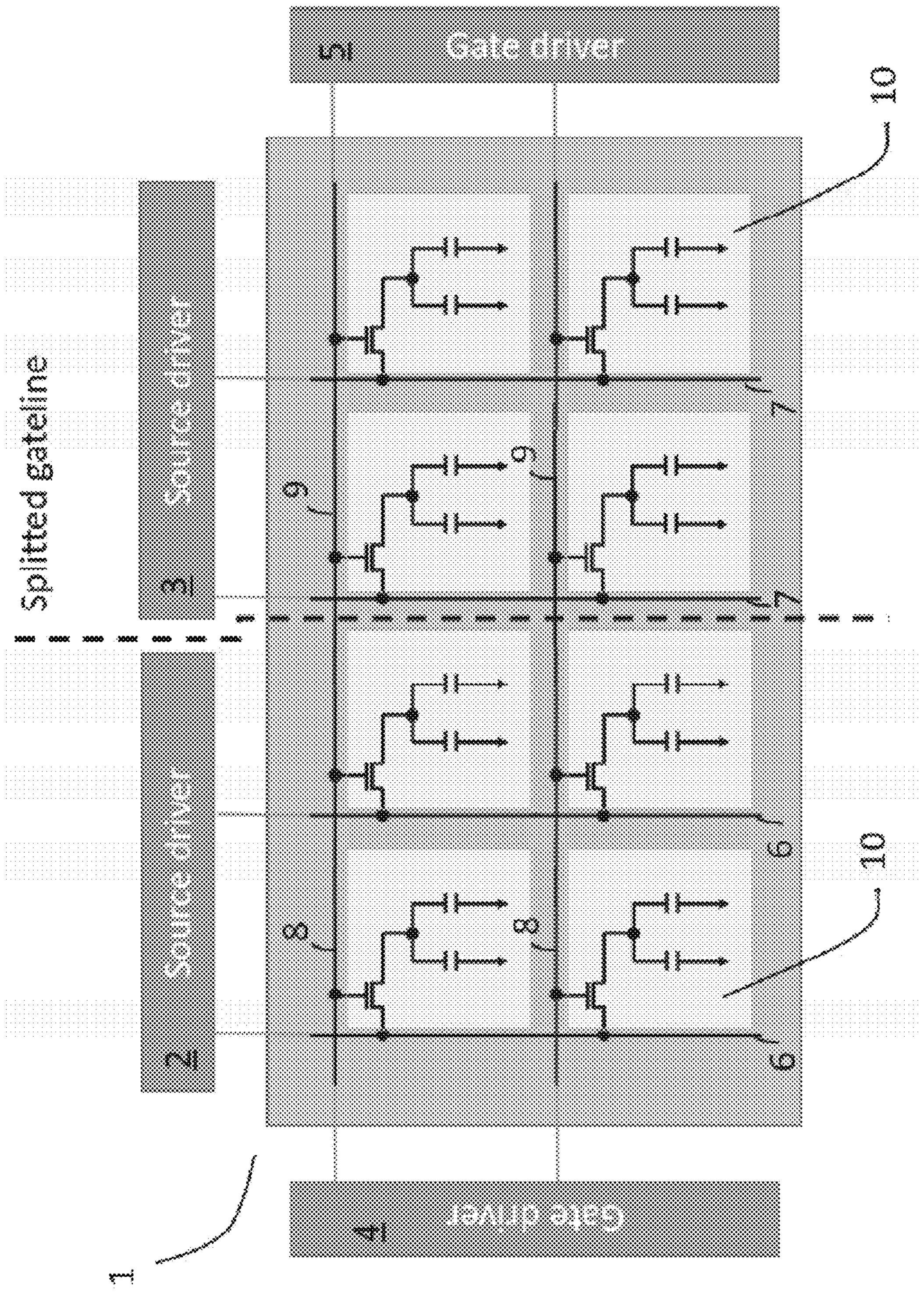
FIG. 1 shows a flat panel display with optionally a split gate, wherein the present invention may be applied.

FIG. 1 shows a flat panel display, optionally with a split gate, wherein the present invention may be applied. The display (1) comprises a first source driver circuit (2) which is configured to drive the source signal lines (6) of the left half of the display and a second source driver circuit (3) which is configured to drive the source signal lines (7) on the right half of the display. The display also comprises a first gate driver circuit (4) which is configured to drive a first portion of gate signal lines (8), in particular on the gate signal lines addressing the pixel cells on the left half of the display. The display in FIG. 1 also comprises a second gate driver circuit (5) which is configured to drive a second portion of gate signal lines (9). In FIG. 1, the display can be split in two halves with respect to the driving electronics. However, the display comprises a single back substrate. The multiple, i.e. two, separately addressable, functional sections hereby comprise a left half and a right half, which halves do not have a visible seam said two display sections. Note that the invention can be applied to displays having only 1 gate driver circuit which drives the first portion of gate signal lines, which first portion then corresponds to all the gate signal lines. The pixel cells (10) are arranged in a matrix defined by the columns and rows defined by the source signal lines (6, 7) and the gate signal lines (8, 9) respectively. Some pixel cells are referenced by (10) in the figure for illustration purposes.

Figure 2:
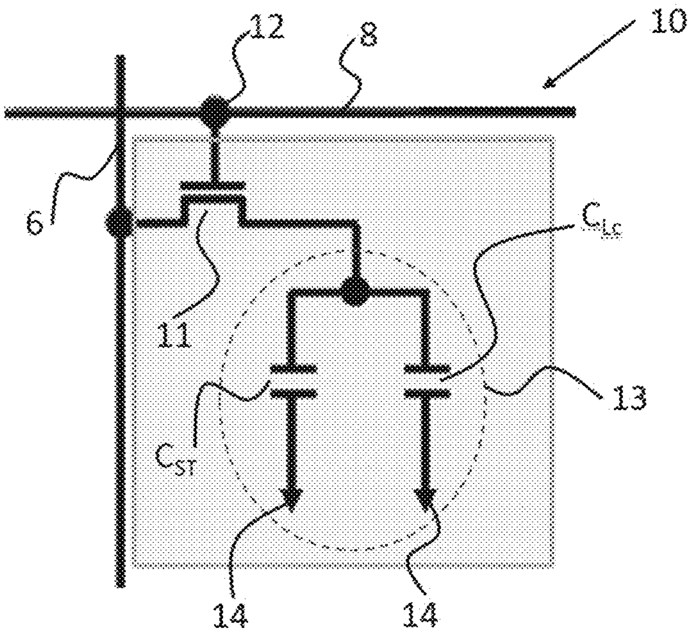
FIG. 2 illustrates a preferred embodiment of a pixel cell in accordance with the present invention.

A preferred embodiment of a pixel cell is illustrated in FIG. 2. Each pixel cell comprises substantially identical electronics and preferably each pixel cell (10) comprises a capacitive data storage portion. The pixel cell preferably comprises a first switch (11) which state is controlled by the gate signal line (8) connected (12) to the switch. If the gate signal line (8) is addressed by a gate signal, the switch is put into a state wherein a source signal on the source signal line (6) is connected through to the data storage portion (13) of the pixel cell, whereby the source signal puts the data storage portion (13) into a state essentially defined by the voltage difference between the source signal and a VCOM (14). Once the gate signal is turned off on the gate signal line (8) addressing said pixel cell, the data storage portion (13) of the pixel cell essentially retains the state it was put in. In normal operation, the pixel cell is re-addressed regularly in accordance with a refresh rate of the display, whereby the state of the pixel cell can be altered and/or refreshed. Refresh rates can be between 10 Hz and 200 Hz or higher than 200 Hz such as up to 3 kHz or even higher. Typical refresh rates are 25-30 Hz or 50-60 Hz, and some high-end displays can have larger refresh rates of about 120 Hz or 144

Figure 3:
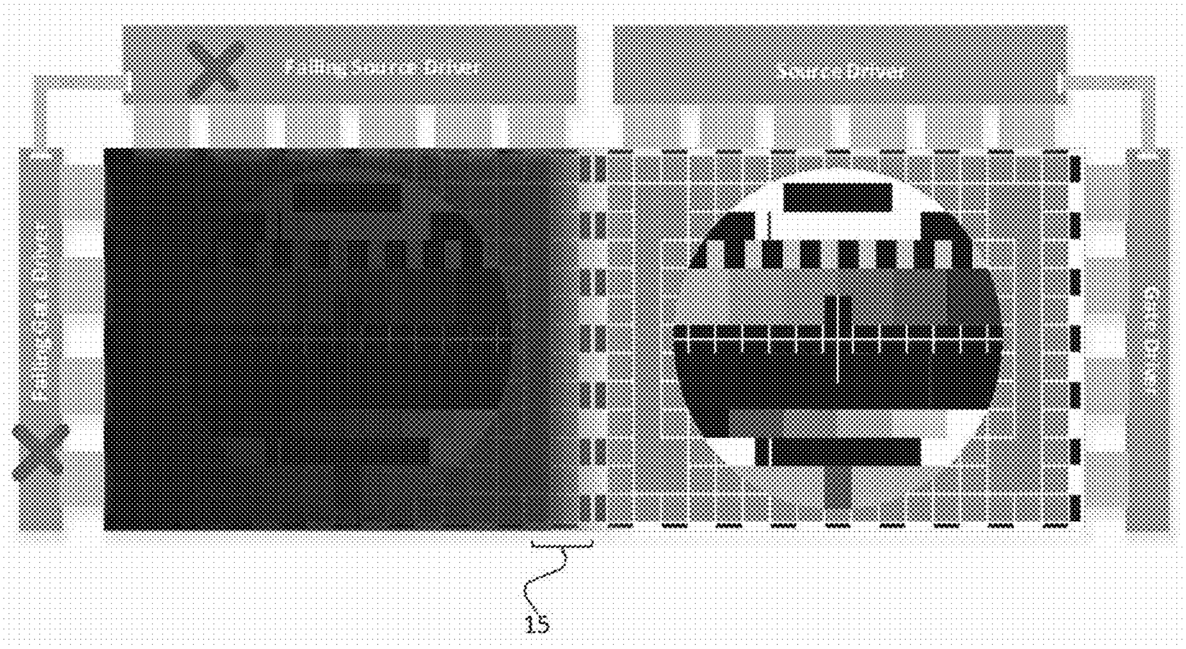
FIG. 3 illustrates the problem of a frozen image.

Hz. Within the context of the present invention, it is important to note that if the pixel cell is not re-addressed, possibly due to a failure, the pixel cell retains the last state it was put in, which can result in a frozen image upon failure. This frozen image (15) persists at least partially even if the backlight is turned off for the first section, as illustrated in FIG. 3. Mechanical measure can be taken in the backlight, e.g. by placing a mirror between display sections, to partially resolve the issue of frozen image. However, these measures may not be sufficient or may be to complex or costly. Nevertheless, in an embodiment of the present invention, the display is provided with a reflector in between contiguous display sections. This lowers the amount of light leakage from one section to the neighbouring display section, thereby reducing the problem of frozen image.

In some embodiments, the display of the current invention can have N source driver circuits and N portions of source signal lines, whereby N is an integer which is at least 2, such as 2, 3, 4, 5, 6, 7, 8, 9, 10 or higher, whereby each source driver circuit is configured to drive a corresponding portion of source signal lines. In some embodiments, the display of the current invention can have M gate driver circuits and M portions of gate signal lines, whereby M is an integer which is at least 1, such as 1, 2, 3, 4, 5, 6, 7, 8, 9, 10 or higher, whereby each gate driver circuit is configured to drive a corresponding portion of gate signal lines.

In a preferred embodiment, upon instruction with respect to the first display section, the default voltage is provided on all source signal lines of the first display section by a multiplexer switch. This is illustrated in FIG. 4.

In a very preferred embodiment, the display comprises a second gate driver circuit (5) which is coupled to a second portion of the gate signal lines and which is coupled to the first portion of the gate signal lines or configured to couple to the first portion of the gate signal lines upon failure in the first display section. This allows to drive the first portion of the gate signal lines also in the case of failure. Hereby the control of this first portion of gate signal lines is taken over by the second gate driver circuit. This is also illustrated in FIG. 4 wherein a first gate driver (4) and a second gate driver (5) are both coupled to the gate signal lines and can be configured to jointly or redundantly address the gate signal lines.

Figure 4:
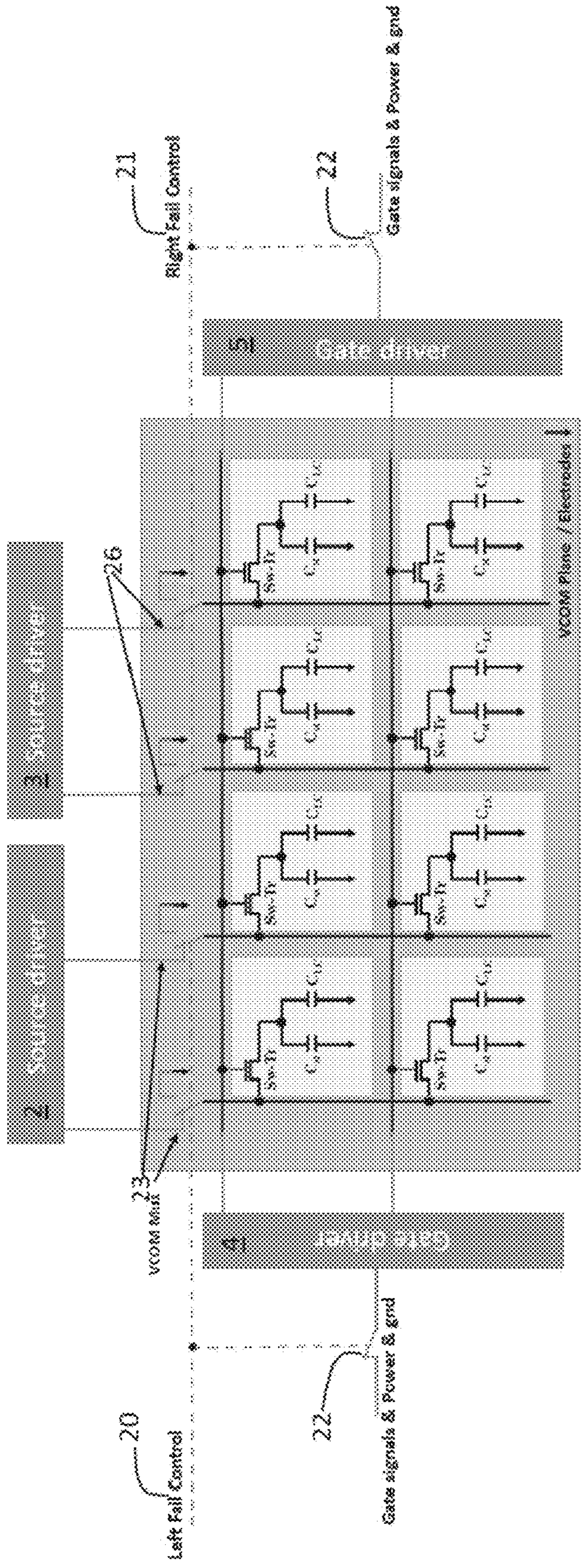
FIGS. 4-8 illustrate embodiments of the present invention.

In a preferred embodiment, which is illustrated in FIG. 4, upon failure on the left side, a left fail controller (20) will open a gate drive isolator switch (22) and put a VCOM multiplexer (VCOM mux, 23) selected to the VCOM voltage. This will bring the voltage over the $C_{ST}$ and $C_{LC}$ to 0V which will turn the pixel in black state.

The left failing screen part will go to fully black because the left gate signal lines can be addressed, preferably line by line, by the right side gate driver circuit (5). The same logic applies for failure in the right side with a right fail controller (21) and a right gate drive isolator switch (24).

In a power-down sequence, the left and right VCOM mux and gate addressing can be used to discharge the pixel cell which will remove charge in the complete cell. Preferably, discharging must occur within less than 1 s, more preferably less than 500 ms, still more preferably less than 250 ms, yet more preferably less than 100 ms. In liquid crystal displays, pixel cells which remain charged over long periods may alter the state of the liquid crystal material. Indeed, a remaining DC voltage over the cell or the cell's capacitor may result in a drift of the liquid crystal material, which may typically be a polar material, towards one of the electrodes. Furthermore, a remaining charge may lead to impurities depositing on the electrodes. The principle of discharging the pixel cell during a powering-down sequence can also be used for emissive displays (led, microled, oled and other types of displays). Indeed, in an embodiment, the display is any of the following: a liquid crystal display, a led display, a microled display or an Oled display.

In some embodiments, the display comprises multiple VCOM electrodes which are preferably electrically isolated, e.g. into left and right VCOM electrodes. Hereby other switch configurations and other voltages as compared to e.g. the non-failing part of the display can be used to discharge the cell to create a black state. The basic idea is to create a state where, independent from a potentially failing source/gate driver, the voltage over a pixel Lc and ST data storage capacitor becomes 0V. 0V over the pixel capacitor will turn the pixel black. In some embodiments, hereby

Figure 5:
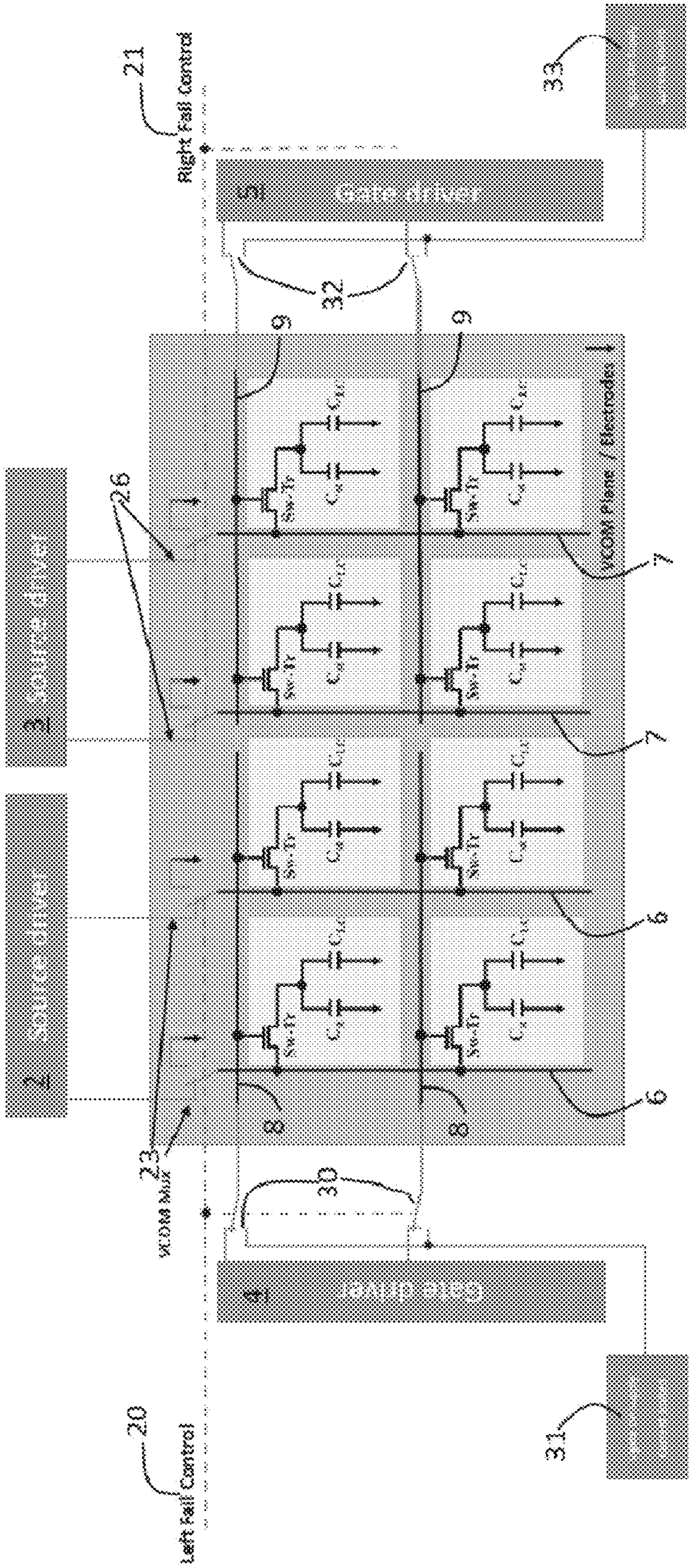

- there is no electrical connection between left gate and right gate, at least not during normal operation of the display. In FIG. 5, the gate lines are cut at or near the center. Note already that in the embodiment illustrated in FIG. 6, the gate lines are continued to the other side.
- Upon failure on one side, e.g. the left side, a left fail control (20) puts the left gate mux (30) to the Vgate ON supply (31) and put the VCOM mux (23) selected to the VCOM voltage.
- A left failing screen part will go to black because the left source signal lines (6) are supplied with VCOM which creates 0V over the pixel data capacitor and thus introduces a black state.
- Vgate supply on the mux (31, 33) may preferably need to be current limited, (e.g. by use of series R or current source) to avoid high peak current which could occur if all gates are addressed at the same time. In an embodiment, a potential current limiting may need to be implemented in the VCOM source to reduce peak current in the source lines when gate lines are addressed, and in particular if multiple, such as all, gate lines are addressed simultaneously.
- The same logic may apply for the right side, i.e. if the failure occurs in the right display section of FIG. 5.
- In an embodiment, when powering down the display, the left VCOM mux (23) and right VCOM mux (26) and gate line addressing can be used to discharge the cell which will remove charge in the cell to have a quick controlled power-down sequence.
- The same principles can be used for LCDs and many types of displays, such as emissive displays (led, microled, oled, others).

Figure 6:
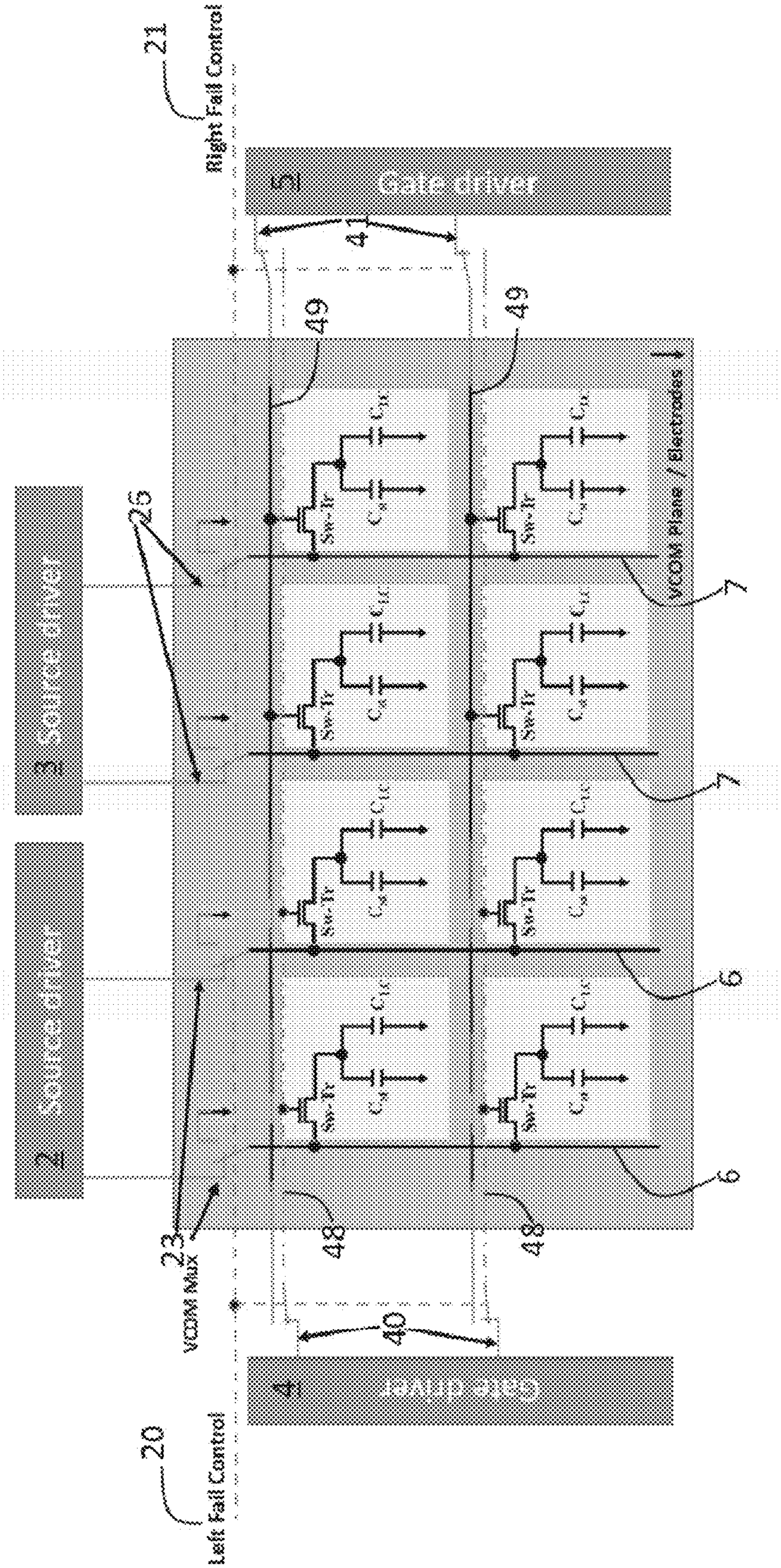

In FIG. 6, another embodiment is illustrated. The embodiment presents an advantage compared to previous embodiments as it reduces the complexity and avoids high peak current to the system while discharging the pixel data capacitors. Hereby:

- Upon failure on one display section, e.g. the left side, a fail control (20) is configured to switch a gate mux switch (40) functionally connecting the gate signal lines (48, dot-dashed lines) of the faulty display section to gate signal lines (49, full lines) of a working display section, thereby preferably also controlling a VCOM mux (23) to select the VCOM to connect to the source lines (6) of the faulty display section.
- The failing display section will go to black because the gate signal lines (48) of the faulty display section are, upon failure in the faulty section, connected to and addressable by a working gate driver circuit (5) in combination with the source lines of the failing display section being connected to the VCOM.

Each display section can be arranged similarly, in the sense that upon failure, the gate signal lines of the faulty display section can be connected to gate line signals of a working display section. E.g. upon failure on one display section, e.g. the right side, a right fail control (21) is configured to switch a gate mux switch (41) functionally connecting the gate signal lines (49, full lines) of the faulty display section to gate signal lines (48, dot-dashed lines) of a working display section, thereby preferably also controlling a VCOM mux (26) to select the VCOM to connect to the source lines (7) of the faulty display section.

Preferably, the Display Is Configured to, Upon Powering Down, switch the VCOM mux (23, 26), and preferably all VCOM mux's (23, 26), to disconnect source lines from the source driver, and preferably to disconnect all source lines from all source driver circuits, and to connect source lines to the VCOM electrode, and preferably to connect all source lines to the VCOM electrode, and address gate signal lines, preferably sequentially, to discharge pixel cells, preferably all pixel cells.

In many instances, it is helpful or even necessary to ensure that a default state, e.g. a black state, is achieved. A check of the correct implementation of a default state can be executed by measuring the electrical signal on the source lines (6, 7). When the default electrical signal is provided to the pixel cell, the source line corresponding to said pixel cell should provide the default electrical signal when or just after the pixel cell is addressed. Note hereby, that the first time a pixel cell which is put in a default state, is addressed, a small transient signal may still occur due to e.g. a remaining pixel data charge present on the pixel cell, e.g. on the capacitors of the pixel cell. Hence, in an embodiment, the display comprises a source signal measurement component which is functionally connected to the one or more source lines (6, 7) and which is configured to measure a signal on said source lines, preferably a voltage signal. Preferably the source measurement component is configured to measure the signal on said source lines within a period after the default electrical signal is provided to the pixel cell, more preferably whereby said period is at most 500 ms, but even more preferably whereby said period is at most 100 ms, still more preferably whereby said period is 50 ms or less, such as 40 ms, 30 ms, 20 ms, 16 ms, 10 ms or any value there between or smaller. Preferably said period is at most 10 times the inverse refresh rate of the display, more preferably at most 5 times the inverse refresh rate of the display, still more preferably at most 2 times the inverse refresh rate of the display, such as 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0 times the inverse refresh rate of the display or any value therebetween, most preferably around 1.0 times the inverse refresh rate of the display. Note hereby that the period begins when the default electrical signal is provided to the pixel cell, which occurs when the default electrical signal is provided to the source line corresponding to the pixel cell and the pixel cell is addressed by the corresponding gate line such that the default electrical signal is imposed onto the pixel cell.

When one, two or more gates, optionally all gates, are addressed, optionally at the same time, e.g. when using a gate mux switch as described above, a characteristic gate signal, typically a current signal, which is optionally a peak current signal, can occur on said one, two or more gate lines and/or on the Vgate supply line, i.e. the connection between the Vgate supply (e.g. refs. 31 and 33 in FIG. 5) and the gate lines (e.g. refs. 8 and 9 in FIG. 5), when a default state is induced. Such characteristic default-induced gate signal and/or the absence thereof may hereby also be used to provide an indication that a default state, e.g. a black state, is correctly induced in the pixel cells. Hence, in such embodiments, preferably the display comprises a gate signal measurement component which is functionally connected to one, two or more gate lines (8, 9) and which is configured to measure a characteristic signal and/or an absence thereof on said gate lines and/or on a Vgate supply line connected to said one, two or more gate lines, said characteristic signal optionally being a characteristic peak and/or a characteristic current signal, preferably a characteristic current peak signal. The non-presence of such a characteristic gate signal is then indicative of an error in providing a default state to one or more of the pixel cells corresponding to the gate lines which are, optionally simultaneously, addressed. For example, with reference to FIG. 5, two or more gate lines may, in an embodiment, be configured to be simultaneously addressed when a default state is to be induced on pixel cells corresponding to said gate lines. This can be done, e.g. by using a gate mux switch. In such case, a peak current may flow through the Vgate supply line which connects the Vgate supply to the gate lines. For another example, with reference to FIG. 6, if one gate driver is faulty, e.g. left gate driver (4), the display may be configured such that the other gate driver, e.g. right gate driver (5), takes over the function of addressing the gate lines on the portion of the display corresponding to the faulty gate driver, e.g. left gate lines (48), by connecting through the gate lines on the faulty portion of the display (48) to the gate lines on the working portion of the display (49), e.g. via a gate mux switch (40). As such, the working gate driver addresses the gate lines on both the working portion as the faulty portion of the display, which leads to an increase of the load on the working gate lines and/or the working gate driver. Consequently, the signal on the working gate lines (49) will show a characteristic change when the pixel cells on the corresponding gate lines are addressed. This characteristic signal and/or the absence thereof can be used to check if a default state is indeed induced on the pixel cells of the faulty display portion.

Preferably the gate signal measurement component is configured to measure the signal on said gate lines and/or Vgate supply line within a period after the default electrical signal is provided to the pixel cell, more preferably whereby said period is at most 500 ms, but even more preferably whereby said period is at most 100 ms, still more preferably whereby said period is 50 ms or less, such as 40 ms, 30 ms, 20 ms, 16 ms, 10 ms or any value there between or smaller. Preferably said period is at most 10 times the inverse refresh rate of the display, more preferably at most 5 times the inverse refresh rate of the display, still more preferably at most 2 times the inverse refresh rate of the display, such as 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0 times the inverse refresh rate of the display or any value therebetween, most preferably around 1.0 times the inverse refresh rate of the display. Note hereby that the period begins when the default electrical signal is provided to the pixel cell, which occurs when the default electrical signal is provided to the source line corresponding to the pixel cell and the pixel cell is addressed by the corresponding gate line such that the default electrical signal is imposed onto the pixel cell.

In embodiments, the display is configured to obtain a source signal measurement value obtained by the source measurement component and/or a gate signal measurement value obtained by the gate signal measurement component as described above, and, if said source signal measurement value and/or said gate signal measurement value is indicative of an error in providing the default electrical signal to the pixel cell, e.g. if the source signal measurement value is different from the VCOM voltage and/or the gate signal measurement value is different from a characteristic default-induced signal, the display is configured to induce a default state by other means, e.g. by interrupting power to backlight of the display or by turning off power to all essential electronical components of the display, such that no misleading information remains visible on the display. As such, the measurement component allows to use a back-up mechanism for inducing a default state in case the preferred mechanism of providing the default electrical signal to the pixel cell does not function properly.

Figure 7:
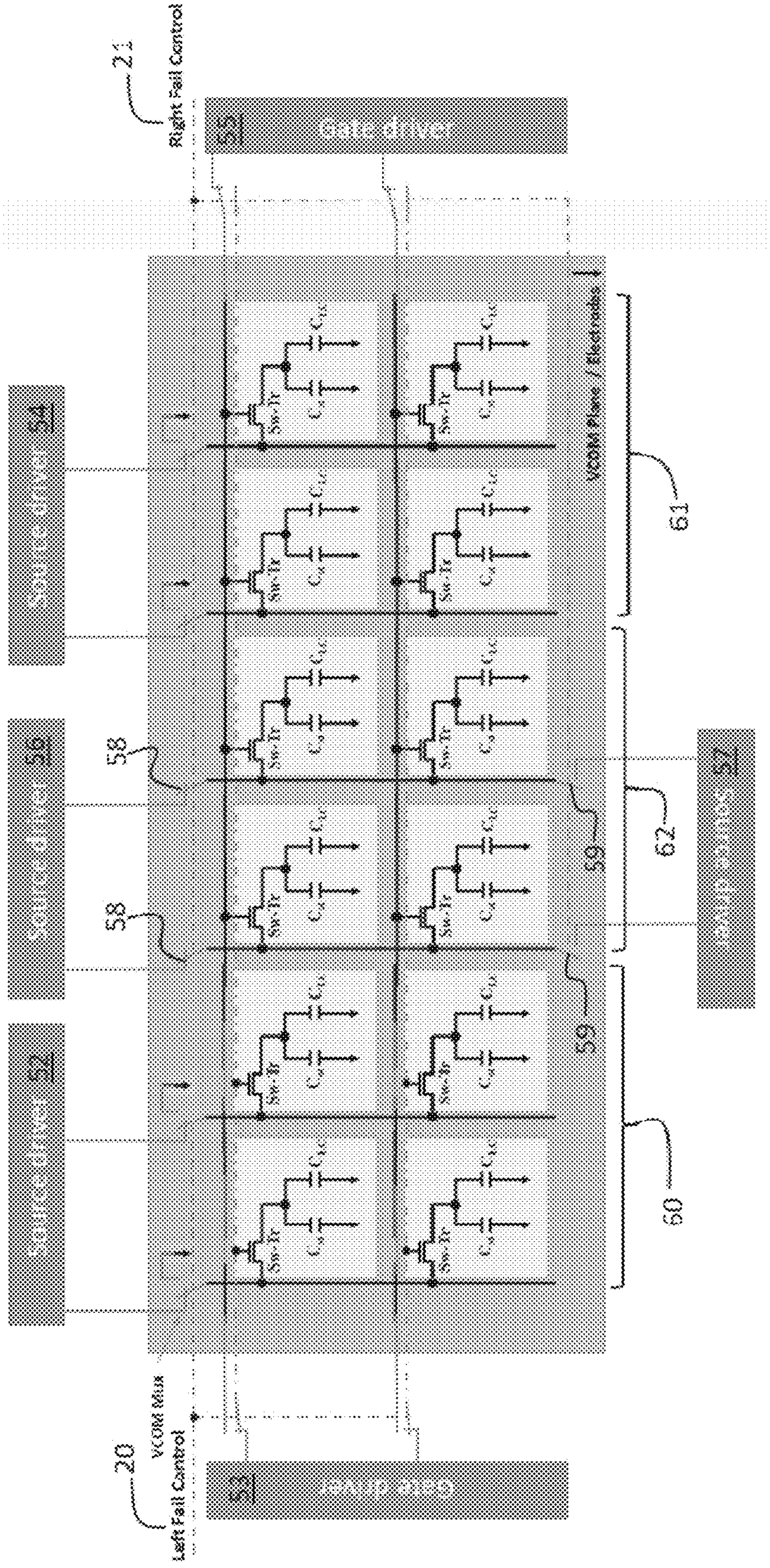

FIG. 7 illustrates a display according to an embodiment of the present invention, comprising three display sections arranged contiguously in a line: a left display section (60), a right display section (61) and a center display section (62) there between. The pixels of the left display section (60) are addressed by a first source driver circuit (52) and a first gate driver circuit (53). The pixels of the right display section (61) are addressed by a second source driver circuit (54) and a second gate driver circuit (55). The pixels of the center display section (62) can be addressed by a third source driver circuit (56) or a fourth source driver circuit (57), and by any of the gate driver circuits (53, 55). The pixels of the center display section (62) can hereby be addressed separately and redundantly by either of the third (56) or fourth (57) source driver circuit and by either of the first (53) and second (55) gate driver circuit, i.e. for instance, the pixels are addressed by the third source driver circuit (56) and the second gate driver circuit (55) in normal operation and, upon failure in the third source driver circuit and/or first gate driver circuit, the pixels of the center display section are addressed by the fourth source driver circuit (57) e.g. by the right fail controller (21) being configured to flip the switches (58) to disconnect the third source driver circuit (56) from the source lines of the center display section and to flip the switches (59) to connect the fourth driver circuit (57) to the source lines of the center display section. Optionally, the second gate driver circuit (53) can be connected to the gate lines of the center section in a manner similar to the embodiment shown in FIG. 6.

The main advantage of this embodiment, is that when an error occurs in one display section, two thirds of the display can still work.

Figure 8:
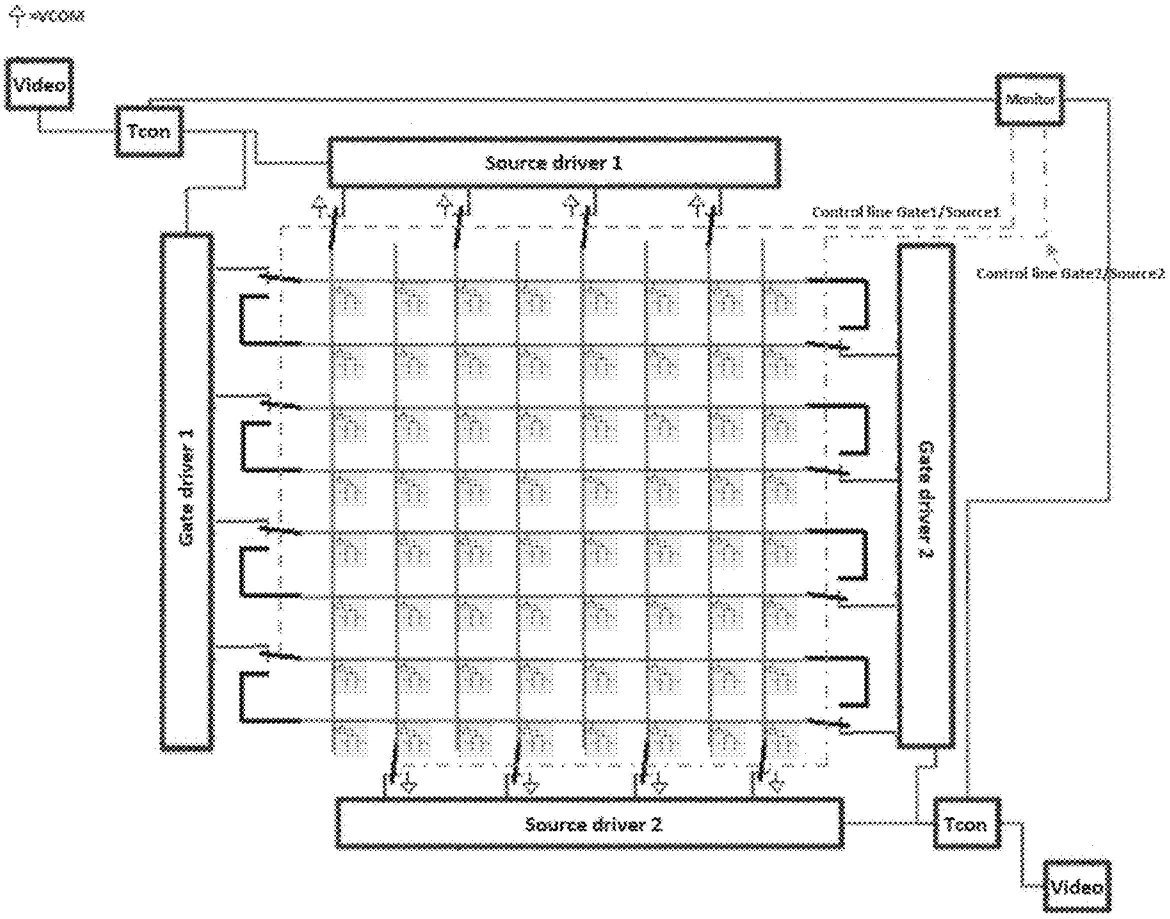

FIG. 8 illustrates an embodiment of the present invention, wherein the source signal lines and the gate signal lines are interleaved. In this case, a first display section comprises pixel cells which are addressed via the odd-numbered source signal lines by a first source driver circuit (Source driver 1) and via the odd-numbered gate signal lines by a first gate driver circuit (Gate driver 1). Further, a second display section comprises pixel cells which are addressed via the even-numbered source signal lines by a second source driver circuit (Source driver 2) and via the even-numbered gate signal lines by a first gate driver circuit (Gate driver 2). The advantage of interleaved display sections is that the full area of the display can still be used to present information upon failure in a section, albeit at lower effective resolution. In case of failure in one section, a VCOM mux is switched to connect the source lines of the faulty section to the VCOM and a gate mux is switched to connect the gate lines of the faulty section to the gate lines of the working display section.

As indicated before, in some embodiments, the VCOM electrode plane is common for all pixel cells of the display. In other embodiments, each display section comprises a VCOM electrode which is common for all pixel cells of said display section.

Figure 9A:
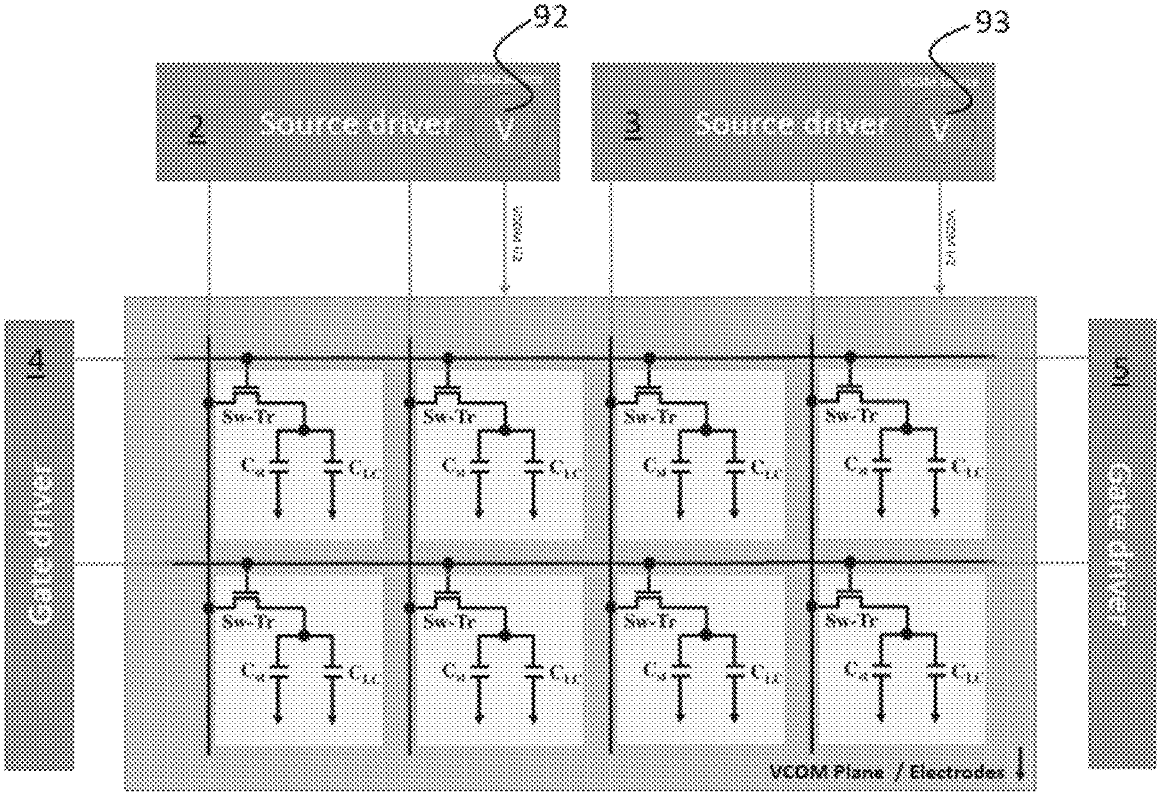
FIGS. 9A-9C illustrate how the VCOM is jointly or redundantly controlled by two source drivers.
Figure 9B:
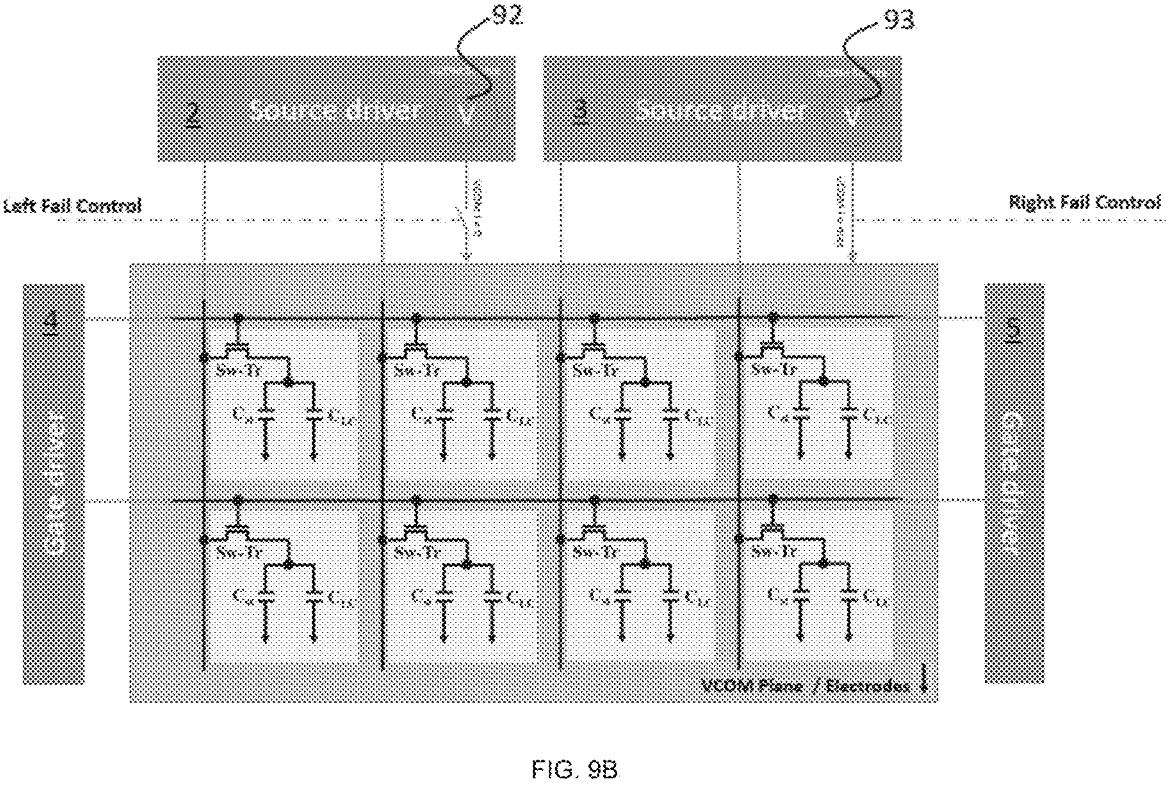
Figure 9C:
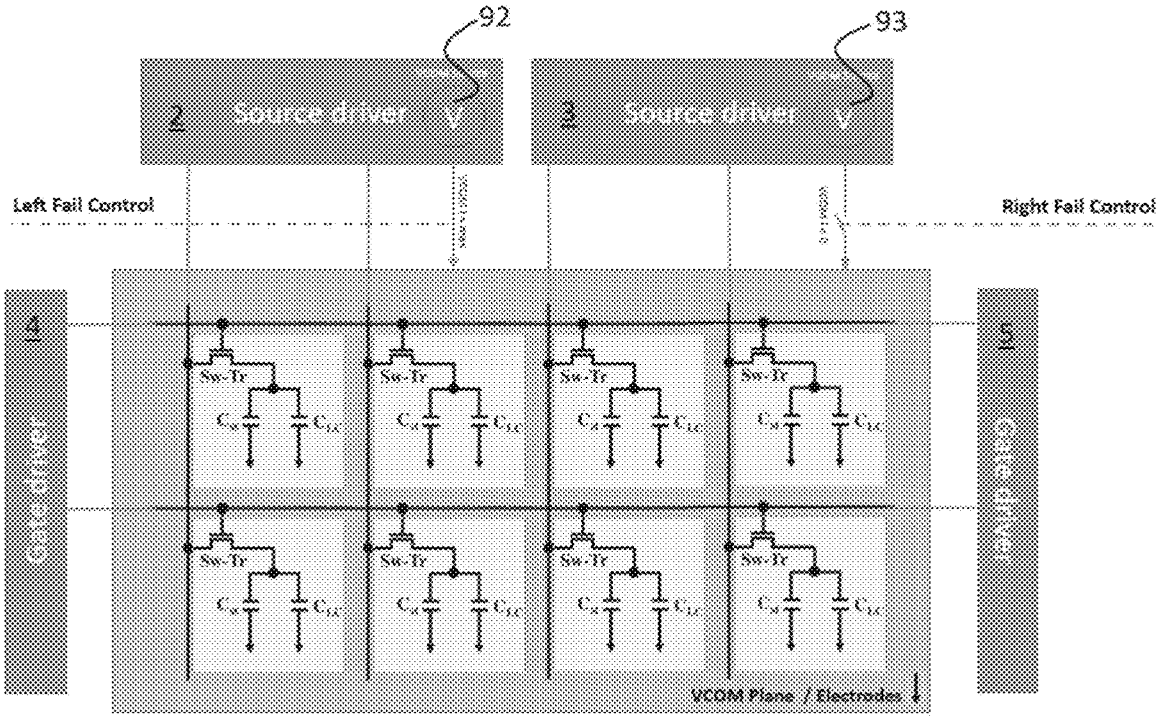

In an embodiment, the display comprises a first VCOM power source and at least a second VCOM power source. FIGS. 9A-9C illustrate how the VCOM is jointly or redundantly supplied by two VCOM power sources which are preferably provided on the source driver boards. FIG. 9A illustrates the normal working condition wherein the power sources (92, 93) jointly supply the VCOM to the display sections. FIG. 9B illustrates, upon failure in the left display section, the disconnection of the left power source (92) from the VCOM electrode, whereby the VCOM is supplied by the right power source (93). FIG. 9C illustrates, upon failure in the right display section, the disconnection of the right power source (93) from the VCOM electrode, whereby the VCOM is supplied by the left power source (92).

In some embodiments, the first VCOM power source is configured to supply the VCOM for the first display section and/or the second VCOM power source is configured to supply the VCOM for the second display section. Alternatively, the first power source and the second power source are configured to jointly supply the VCOM for the first display section and the second display section.

In some embodiments, the first power source is configured to supply the VCOM for the first display section and the second display section and the second power source is configured to supply the VCOM for the first display section in case of failure of the first display section, of the first source driver and/or of the first power source. Alternatively, the second power source is configured to supply the VCOM for the first display section and the second display section and the first power source is configured to supply the VCOM for the second display section in case of failure of the second display section, of the second source driver and/or of the second power source. I.e. in preferred embodiment, one power source is configured to supply the VCOM for a first display section and the second display section and optionally all display sections, and at least one other power source is configured to supply the VCOM for the first display section and the second display section and optionally all display sections in case of failure of said one power source, and/or of the corresponding display section and/or corresponding source driver circuit. Basically, this results in redundancy of the power sources with respect to the supply of the VCOM.

The invention claimed is:

1. A flat panel active-matrix or passive-matrix display, preferably a liquid crystal display, comprising:

- a single back substrate divided into multiple electrically isolated or non-isolated, separately addressable, functional display sections, preferably having no visible seam between said multiple display sections;
- a set of source signal lines defining a set of columns, a set of gate signal lines defining a set of rows, and a set of pixel cells arranged in a matrix of rows and columns such that each pixel cell is addressable by a corresponding source-gate (SG) pair which comprises a source signal line and a gate signal line;
- at least a first source driver circuit coupled to a first portion of the source signal lines corresponding to at least a first display section and a second source driver circuit coupled to a second portion of the source signal lines corresponding to at least a second display section;
- at least a first gate driver circuit coupled to a first portion of the gate signal lines;

whereby, during normal operation, each pixel cell is configured to be charged with a pixel-dependent electrical signal provided by the source signal line of the SG pair corresponding to said pixel cell when the gate signal line of the SG pair corresponding to said pixel cell is activated; and wherein, upon powering down the first display section due to a failure, the display is configured to switch one or more multiplexer switches to disconnect the source signal lines corresponding to the first display section from the first source driver circuit, connect the source signal lines corresponding to the first display section to a common reference voltage (VCOM) electrode to provide a default electrical signal on the source signal lines corresponding to the first display section, and address the gate signal lines corresponding to the first display section to discharge the pixel cells of the first display section, such that each pixel cell of said first display section is configured to adopt the default electrical signal provided by the source signal line of the SG pair corresponding to said pixel cell.

2. The display according to claim 1, wherein the display is configured to turn off a backlight of the first display section upon failure therein.

3. The display according to claim 1, wherein the pixel-dependent electrical signal is a pixel-dependent voltage signal and wherein the default electrical signal is a default voltage.

4. The display according to claim 3, wherein the default voltage is a VCOM.

5. The display according to claim 1, wherein each display section comprises a VCOM which is common for all pixel cells of said display section.

6. The display according to claim 4, comprising a first VCOM power source and at least a second VCOM power source, wherein the first VCOM power source is configured to supply the VCOM for the first display section and/or the second power source is configured to supply the VCOM for the second display section.

7. The display according to claim 4, comprising a first VCOM power source and at least a second VCOM power source, wherein the first VCOM power source and the second VCOM power source are configured to jointly supply the VCOM for the first display section and the second display section.

8. The display according to claim 4, comprising a first VCOM power source and at least a second VCOM power source, wherein one of the VCOM power sources is configured to supply the VCOM for the first display section and the second display section and optionally all display sections, and another of the VCOM power sources is configured to supply the VCOM for the first display section and the second display section and optionally all display sections in case of failure of said one VCOM power, and/or optionally of the corresponding display section and/or corresponding source driver circuit.

9. The display according to claim 1, wherein each pixel cell comprises a capacitive data storage portion.

10. The display according to claim 1, wherein the display comprises a second gate driver circuit coupled to a second portion of the gate signal lines and which is coupled to the first portion of the gate signal lines or configured to couple to the first portion of the gate signal lines upon instruction with respect to the first display section.

11. The display according to claim 10, wherein upon instruction with respect to the first display section, a fail control of the display is configured to switch a gate mux switch functionally connecting the gate signal lines of the first display section to gate signal lines of another display section, thereby preferably also controlling a VCOM mux to select the VCOM to connect to the source lines of the first display section.

12. The display according to claim 10, wherein the gate signal lines of the first display section are, upon instruction with respect to the first display section, connected to and addressable by the second gate driver circuit.

13. A flat panel active-matrix or passive-matrix display, preferably a liquid crystal display, comprising:

a single back substrate divided into at least one and preferably multiple electrically isolated or non-isolated, separately addressable, functional display sections, preferably having no visible seam between said multiple display sections;

a set of source signal lines defining a set of columns, a set of gate signal lines defining a set of rows, and a set of pixel cells arranged in a matrix of rows and columns such that each pixel cell is addressable by a corresponding SG pair which comprises a source signal line and a gate signal line;

at least a first source driver circuit coupled to a first portion of the source signal lines corresponding to a first display section and optionally a second source driver circuit coupled to a second portion of the source signal lines corresponding to a second display section;

at least a first gate driver circuit coupled to a first portion of the gate signal lines;

whereby, during normal operation, each pixel cell is configured to be charged with a pixel-dependent signal voltage provided by the source signal line of the SG pair corresponding to said pixel cell when the gate signal line of the SG pair corresponding to said pixel cell is activated; and whereby, upon powering down a display section due to a failure, the display is configured to switch one or more multiplexer switches to disconnect the source signal lines corresponding to the first display section from the first source driver circuit, connect the source signal lines corresponding to the first display section to a common reference voltage (VCOM) electrode to provide a default electrical signal on the source signal lines corresponding to the first display section, and address the gate signal lines corresponding to the first display section to discharge the pixel cells of the first display section, such that each pixel cell of said display section is configured to adopt a default voltage provided by the source signal line of the SG pair corresponding to said pixel cell.

14. The display according to claim 13, which comprises a source signal measurement component which is functionally connected to the one or more source lines and which is configured to measure a signal on said source lines, preferably a voltage signal.

15. The display according to claim 13, which comprises a gate signal measurement component which is functionally connected to one, two or more gate lines and which is configured to measure a characteristic signal and/or an absence thereof on said gate lines and/or on a Vgate supply line connected to said one, two or more gate lines, said characteristic signal optionally being a characteristic peak and/or a characteristic current signal, preferably a characteristic current peak signal.

* * * * *